J. BECK.
METHOD OF OBTAINING SYNCHRONISM BETWEEN A KINEMATOGRAPHIC PERFORMANCE AND AN ACOUSTIC ACCOMPANIMENT THEREOF.
APPLICATION FILED FEB. 26, 1912.
1,069,221.  Patented Aug. 5, 1913.
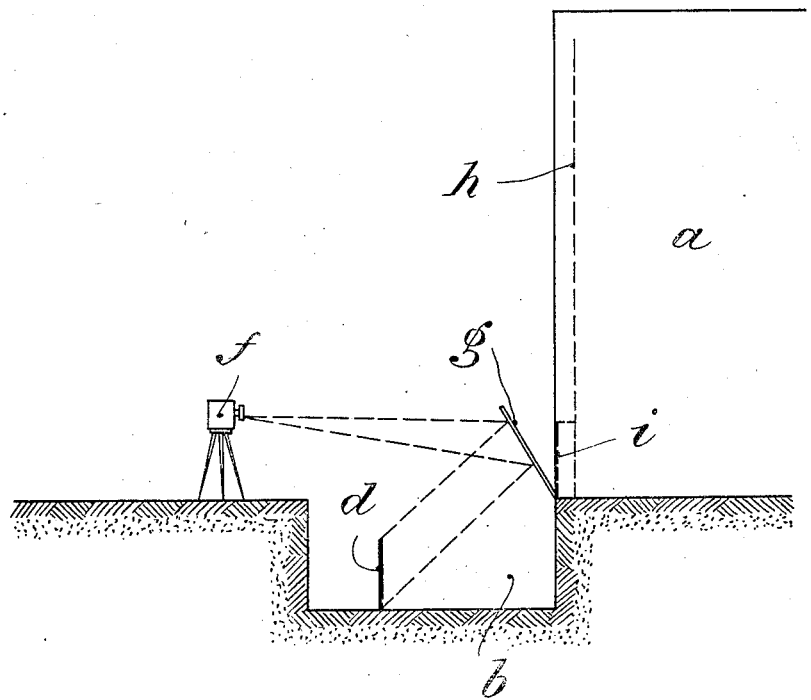

UNITED STATES PATENT OFFICE.

JAKOB BECK, OF MUNICH, GERMANY.

METHOD OF OBTAINING SYNCHRONISM BETWEEN A KINEMATOGRAPHIC PERFORMANCE AND AN ACOUSTIC ACCOMPANIMENT THEREOF.

1,069,221.  Specification of Letters Patent.  Patented Aug. 5, 1913.

Application filed February 26, 1912. Serial No. 680,071.

*To all whom it may concern:*

Be it known that I, JAKOB BECK, a subject of the German Emperor, and a resident of Munich, Kingdom of Bavaria, Germany, have invented new and useful Improvements in Methods of Obtaining Synchronism between a Kinematographic Performance and an Acoustic Accompaniment Thereof, of which the following is a specification.

When kinematographic performances are to be accompanied by acoustic performances which are not mechanically produced, it causes much difficulty to obtain a perfect synchronism between the play and the accompaniment. The accompaniment mostly starts either too early or too late. The cause resides in the fact, that the speed of the film frequently varies during the display and there is no positive relation between the speed of the film and the time of the accompaniment.

It has been tried to employ the kinematograph together with a phonograph by coupling the two by means of a device producing the required synchronism. But in such cases the accompaniment is mechanically produced. Besides it has been observed, that the synchronizing coupling device, particularly after long use, will not operate so precisely that actually a synchronism is obtained.

To obviate all these difficulties the present invention provides, that when the kinematographic play is being photographed, the band master of the orchestra accompanying the play is simultaneously photographed together with the play at some suitable part, preferably at the side or the lower edge of the film: this photograph of the band master may be either a whole or partial photograph; in the latter instance only the movements of his arms and the upper part of his body would be photographed. As the band master turns his face toward the stage during the original recording play, he will be photographed without need of any further arrangements, from behind, and will appear in such position on the film. The persons positioned behind the screen during the performance and accompanying the same will then, however, not be able to see a part of the movements of the band master, namely those which are covered by his back and this may again cause irregularities in the commencement of the accompanying music. For avoiding this difficulty the band master is not photographed directly, but only his reflected image.

The accompanying drawing exemplifies in a diagrammatic manner the method of recording the kinematographic performance.

In this drawing *a* is the stage, on which the actors perform; *b* is the orchestra pit; *d* is the band master and *f* is the recording camera, which is placed in the auditorium. For obtaining a front view of the band master looking toward the stage, a mirror *g* is mounted at a suitable point of the stage, in which the image of the band master will be reflected. When therefore the view on the stage is photographed by the camera *f* the band master will appear on the finished picture as if seen from in front. His image may then be projected against the lower part of the screen *h*, which is then, if the projection is made from behind the screen, covered by a suitable partition *i;* the photograph may, however, also be made in such a manner, that the band master is shown on the side of the film and is accordingly projected. By such means the persons producing the acoustic accompaniment of the kinematographic display, (actors, singers, musicians and the like) who are placed during the performance behind the screen *h* are in a position, to exactly follow the directing movements of the band master and to begin at the proper moments and accompany the play in the proper time, as the speed of the movements of the directing person will now vary with the varying speed of the film. The whole performance will thereby receive a uniform character, both in the play and the accompaniment, and the artistic requirements can be met in a better manner than was hitherto possible.

The movements of the band master may be screened from the audience by means of walls, curtains, wings or the like, while the actors, singers, musicians and the like behind the screen can see them.

I claim:

A method of synchronizing a visual performance and an acoustic accompaniment therefor, which consists, in photographing on a film the performance of the actors, and in simultaneously photographing on said film a reflected front view of a person facing the actors and directing the acoustic accompaniment of the performance, substantially as described.

In testimony whereof I affix my signature in presence of two witnesses.

JAKOB BECK.

Witnesses:
A. V. W. COTTER,
RICHARD LEMP.